(12) United States Patent
Axelrod (10) Patent No.: US 8,845,891 B2
(45) Date of Patent: Sep. 30, 2014

(54) AQUARIUM FILTER MEDIA INCLUDING NANOFIBERS

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 413 days.

(21) Appl. No.: 13/179,606

(22) Filed: Jul. 11, 2011

(65) Prior Publication Data

US 2012/0312744 A1 Dec. 13, 2012

Related U.S. Application Data

(60) Provisional application No. 61/495,338, filed on Jun. 9, 2011.

(51) Int. Cl.
*A01K 63/04* (2006.01)
*C02F 3/00* (2006.01)

(52) U.S. Cl.
CPC .............. *A01K 63/045* (2013.01); *C02F 3/00* (2013.01); *B01D 2239/025* (2013.01); *B01D 2239/0407* (2013.01); *B01D 2239/0618* (2013.01); *B01D 2239/1225* (2013.01); *B01D 2239/1233* (2013.01); *Y10S 210/903* (2013.01)
USPC ....................... 210/167.22; 210/615; 210/903

(58) Field of Classification Search
CPC ............... B01D 2239/1233; B01D 2239/0618; B01D 2239/1225; B01D 2239/025; B01D 2239/0407; A01K 63/045; C02F 3/00
USPC ..................... 210/615, 150, 151, 167.22, 903
See application file for complete search history.

(56) References Cited

U.S. PATENT DOCUMENTS

| 7,419,601 B2 * | 9/2008 | Cooper et al. ................. 210/679 |
| 8,460,547 B2 * | 6/2013 | Sun et al. ..................... 210/615 |
| 2008/0264258 A1 | 10/2008 | Mares et al. |
| 2009/0035599 A1 | 2/2009 | Kim et al. |
| 2009/0221047 A1 | 9/2009 | Schindler et al. |
| 2010/0050872 A1 | 3/2010 | Lee |

OTHER PUBLICATIONS

Search Report and Written Opinion from corresponding PCT Application No. PCT/US2012/041472 dated Aug. 17, 2012.

* cited by examiner

*Primary Examiner* — Fred Prince
(74) *Attorney, Agent, or Firm* — Grossman, Tucker, Perreault & Pfleger, PLLC (57) ABSTRACT

A filtration device for an aquarium comprising a filtering chamber for receiving water and a filter medium therein wherein said filter medium comprises fibers having a diameter from 0.1 nm to 3000 nm and an aspect ratio of length to diameter of 5:1 to 10,000 to 1 wherein said fibers provide for colonization of nitrosomonas bacterium and/or nitrobacteria.

19 Claims, 6 Drawing Sheets

AQUARIUM FILTER MEDIA INCLUDING NANOFIBERS

CROSS-REFERENCE TO RELATED APPLICATIONS

The present application claims the benefit of the filing date of U.S. Provisional Application Ser. No. 61/495,338, filed on Jun. 9, 2011, the teachings of which are incorporated by reference herein.

FIELD OF INVENTION

The present invention relates generally to an aquarium filter, and more particularly to filter media including nanofibers, which may provide mechanical and biological filtration. The filter media may include bacteria preloaded on the media for triggering biological filtration according to the nitrogen cycle. The filter media therefore provides relatively high efficiency biological filtration without compromising chemical and/or mechanical filtration.

BACKGROUND OF THE INVENTION

Filters have been used in aquariums for many years to remove particulate matter from the aquarium water in order to keep the aquarium clean. Traditionally, the most common type of aquarium filter is a power filter which hangs on the outside of the aquarium over the top edge. It includes a siphon tube which carries water from the aquarium into a filter box. Water entering the filter box flows over various types of filter media to remove particulate matter from the water. The water passes through filter carbon to remove chemical impurities from the water which is then pumped back into the aquarium using a pump. Examples of such power filters include the Supreme Aqua King power filter marketed by E. G. Danner Manufacturing Co., the Second Nature Whisper power filter marketed by Willinger Bros. Mfg. Co., and the Aqua Clear power filter marketed by Rolf Hagen Manufacturing Co.

Another type of aquarium filter is a canister type filter which may be positioned outside and below the aquarium. Intake and output hoses hang over the aquarium edge and are connected to the canister filter on the floor. Water is fed by gravity through the intake hose from the aquarium to the canister. The aquarium water is both mechanically and chemically treated and pumped back into the aquarium by a pump contained in the canister. Examples of canister type filters include the Hagen Fluval filter marketed by Hagen USA Mfg., Co., Marine Land Canister Filter marketed by Aquaria, Inc., and Eheim Classic Canister Filters, marketed by Eheim GmbH & Co. KG.

An internally mounted power filter is still another type of aquarium filter. Such a filter comprises a small canister with a built-in pump which is submerged inside the aquarium. Water enters the bottom of the canister and flows through a filter sleeve which removes particulate and chemical waste. The filtered water is then pumped out the top of the canister and back into the aquarium. Examples of this type of filter are the Supreme Ovation internal filter marketed by Danner Mfg. and the Hagen Fluval internal filter sold by Hagen USA Mfg. Co.

Still another type of filter employed in aquariums is the undergravel filter which consists of a perforated raised plate which rests on the aquarium floor. Riser tubes are provided on either end of the filter and extend into the top of the aquarium. Gravel is placed on top of the plate to a thickness of about 2 inches. Air lines from an external pump are placed in the riser tubes to the bottom plate and an air stone is placed at the end of the air lines. Air is forced by the pump through the air stones thereby forcing air bubbles to travel up through the tubes to the water surface creating turbulence or current. Water is then pulled through the gravel and forced up the riser tubes. Waste from the aquarium is drawn through the gravel bed where bacteria break down any ammonia or nitrites to less harmful nitrates. A biological filter does not, however, remove all chemical wastes. Examples of such undergravel filters include filters marketed by Perfecto Mfg. and Penplex Mfg.

Yet another type of prior art filter commonly used in aquariums is a wet/dry trickle type filter which includes a skimmer box that hangs inside the aquarium at the top. Siphon tubes are provided for carrying water from the aquarium to a pre-filter which is mounted directly behind the skimmer box on the outside of the aquarium. Water passes through foam sleeves in a pre-filter to trap particulate matter. The water then travels through the hose in a tank typically positioned beneath the aquarium. As water enters the tank beneath the aquarium, it flows onto a drip plate or spray bar in a dry chamber of filters which contains a plurality of plastic biospheres. Water drips over and through the biospheres to the bottom section of the tank. Bacteria colonies grow on all biospheres which feed on waste products in the water passing over them. From there, the water gathers in the bottom of the filter tank and then passes through a carbon filter or other filter to remove chemical wastes from the water. The water is then passed through dolomite, crushed coral or crushed clam shells to buffer the water which is then pumped through the return hose back to the aquarium. Wet/dry filters can include mechanical, chemical and biological filters. Examples of such filters are the Plus Series trickle filter marketed by Oceanic System, Inc. and the Perfecto Wet/Dry filtration system sold by Perfecto Mfg. Co.

Wet/dry filters may also be built into the aquarium and form a permanent part of the tank. One such wet/dry filter that is permanently built into the tank is marketed by Tenecor Corporation of Tempe, Ariz.

An alternative form of the wet/dry filter is an internally mounted wet/dry filter which includes an integrated pump and heater for small aquariums. The filter is placed inside the aquarium against the rear wall with the top of the filter at the water level. Water enters the filter and then passes through the filter cartridge which removes particulate and chemical waste materials. A portion of the water is then pumped into a drip plate in a dry chamber for biological filtration. The remaining water is then pumped directly back into the aquarium so as to bypass the dry area. One such filter is marketed by Rolf Hagen Mfg. under the trademark "Biolife" filter.

As should be clear from the above, proper and continuous filtration is critical to keeping happy, healthy fish, and there are three basic filtration methods: mechanical, biological and chemical. However, one long-standing problem is, e.g., that while freshly charged filter media accomplish their intended goals, over time, they tend to loose efficiency.

For example, mechanical filtration media, the means by which large particles of excess food and other debris are removed, screened, or skimmed from the water, may become clogged over time, reducing their ability to function as intended. Chemical filtration uses activated carbon and ammonia absorbents, such as zeolite, to remove odor, colors and harmful substances, such as ammonia, from the water. However, activated carbon will also loose its effectiveness over time and will similarly need replacement.

In addition, while replacement of mechanical and chemical filtration is ultimately necessary, careful attention must be placed upon the primary means of removing ammonia and nitrites (by-products of fish waste), which is the biological filter. A well-established aquarium is a natural ecosystem in which fish and the beneficial bacteria that naturally occur in an aquarium depend upon each other to live happily and healthy. The result of this interrelationship is commonly referred to as the "Nitrogen Cycle". Fish eat and produce ammonia as a waste product. Excess food and plant materials also decay and produce ammonia. Beneficial bacteria (aerobic) neutralize the ammonia and produce nitrites, which in turn are neutralized by other beneficial bacteria that produce nitrates. Nitrates in normal levels are harmless to freshwater fish, and over time, can be readily removed from the aquarium by partial water changes. Thus, the natural system in an aquarium converts toxic ammonia into harmless nitrates; all without chemicals or consumer assistance.

Expanding upon the above, there clearly needs to be a place for the aerobic bacteria to foster and grow within the filter system. It turns out that bacteria will grow on any porous surface in the filter assembly, e.g., on the media in a canister filter that pumps a steady flow of water for the bacteria to survive. That is, the water must be oxygenated as the aerobic bacteria require oxygen to reproduce and grow. An aquarium with proper aeration of the water and good water flow over the beneficial bacteria will provide sufficient oxygen to maintain the beneficial aerobic bacteria. And, of course, there must be a source of food (ammonia) for the bacteria. Any tank with fish or plants will provide sufficient food. The filtration system then circulates the ammonia carrying water over the beneficial bacteria for them to eat.

Once established, the bacteria inside the canister filter assembly are clearly invaluable and critical for a successful aquarium. However, as noted, the need to remove and regularly exchange portions of the chemical and mechanical media is also necessary. However, when exchanging mechanical and chemical media, it is important to do so in a manner that would not totally disrupt the biological filter media, which could lead to catastrophic results.

In addition, it is important that such filters are efficient and preferably provide a tortuous flow path along with sufficient residence time for the media to act upon the water.

Accordingly, it is an object of this invention to provide a filter and/or filter system that can be mounted to, near and or within the aquarium that includes filter material that may foster the growth of bacteria and/or other biological organisms and/or provide a means for mechanically filtering the aquatic environment.

It is a more specific object of this invention to therefore provide filter media for an aquarium that relies upon nanofiber geometry which configuration allows for relatively high efficiency biological filtration, relatively shorter initial tank cycling, which in turn may yield a more balanced biological filtration environment.

SUMMARY

A filtration device for an aquarium comprising a filtering chamber for receiving water and a filter medium therein wherein the filter medium comprises fibers having a diameter from 0.1 nm to 3000 nm and an aspect ratio of length to diameter of 5:1 to 10,000 to 1 wherein the fibers provide for colonization of nitrosomonas bacterium and/or nitrobacteria.

In another exemplary embodiment, the present disclosure relates to filtering media comprising fibers having a diameter from 0.1 nm to 3000 nm and an aspect ratio of length to diameter of 5:1 to 10,000 to 1 wherein the fibers contain nitrosomonas bacterium and/or nitrobacteria or precursors thereof.

In a still further embodiment, the present disclosure relates to a method for filtering water in an aquarium comprising supplying a filter medium wherein the filter medium comprises fibers having a diameter from 0.1 nm to 3000 nm and an aspect ratio of length to diameter of 5:1 to 10,000 to 1 wherein the fibers provide for colonization of nitrosomonas bacterium and/or nitrobacteria.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION OF THE INVENTION

As alluded to above, bacteria present within an aquarium, such as within filter media, may convert ammonia, a by-product of the fish or other species, into nitrites and then nitrites into nitrates. Ammonia is relatively toxic to most aquarium fishes in low concentrations of 1 to 3 ppm. Nitrites may be relatively less toxic to most aquarium fishes until concentrations of 30 to 40 ppm are reached and nitrates may be safe for aquarium fishes until concentrations of 300 to 400 ppm are reached. Nitrates may then be taken up by aquarium plants and used as vegetation building blocks. Thus, a greater the amount of bacteria present may lead to increased biological/chemical filtration. The present disclosure relates generally to an aquarium filter, and more particularly to filter media including nanofibers, supporting increased bacteria growth. The filter media may not only provide mechanical filtering for particulate matter of smaller size, but increased biological and/or chemical filtration as well.

Figure 1:
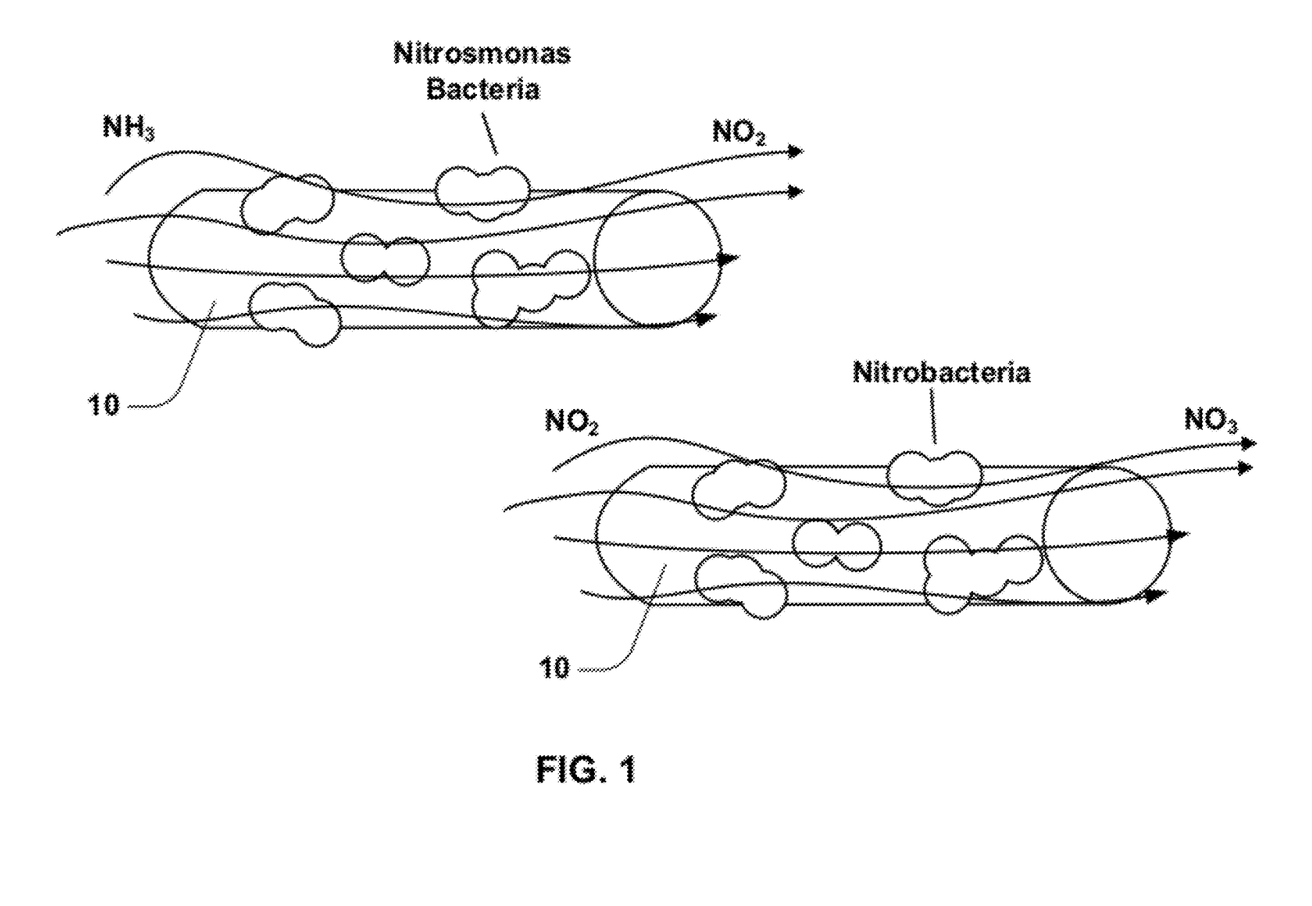
FIG. 1 illustrates a biological filtration mechanism wherein bacteria colonies change ammonia into nitrites and then nitrites into nitrates.

More specifically, as illustrated in FIG. 1, the bacteria growth promoted on the filter media including nanofibers 10 herein may include, for example, the nitrosomonas bacteria which typically provide conversion of ammonia ($NH_3$) to nitrite ($NO_2$). In addition, the bacteria growth promoted herein may include the nitrobacteria, which converts nitrite ($NO_2$) to nitrate ($NO_3$). Furthermore, as explained more fully below, the development and colonization of such bacteria occurs relatively more quickly during the initial cycling of a given aquarium tank while still allowing for relatively high efficiency particle and/or chemical filtration. Reference to colonization may be understood as that situation where regions of bacteria develop on or within the nanofiber substrates.

The filter media may include, consist essentially of, or consist of nanofibers, which may exhibit diameters (or largest linear cross-sections) in the range of 0.1 nm to 3,000 nm and an average diameter (or largest linear cross-section) of 1 μm or less, including all values and ranges from 0.1 nm to 1,000 nm, such as from 100 to 900 nm, 300 to 800 nm, etc. In some embodiments, up to 80% by weight of the fibers may fall within the range of 200 nm and 800 nm. Further, the filter media including the nanofibers may exhibit relatively high surface area of greater than 2 square meters per gram and up to 50 square meters per gram, including all values and ranges therein such as 2 square meters per gram to 10 square meters per gram, etc. The relatively high surface area may provide a greater surface area for additional bacteria growth and/or contact with a relatively greater volume of water. In further embodiments, the surface of the nanofibers may be textured to further increase the surface area, providing for further bacteria growth.

The nanofibers may also exhibit a length to diameter ratio, i.e., aspect ratio, of 5:1 or greater and up to, for example, 10,000:1, including all values and ranges therein such as 100:1, 500:1, 1,000:1 etc. The nanofibers may be formed of a thermoplastic material including polyolefins, such as polyethylene or polypropylene; or polyesters, such as polyethylene terephthalate or polybutylene terephthalate; as well as other materials such as nylon, acrylic, cellulose, etc. The fibers may be provided as a bale, woven or non-woven fabric, or batt. In some embodiments, the fabric or batt may be lofted. The filter media may also exhibit an average pore diameter in the range of 0.1 to 16 microns, including all values and ranges therein, such as 0.1 to 2 microns, etc. Furthermore, the filter media may exhibit a basis weight of 30 grams per square meter to 70 grams per square meter, including all values and ranges therein, such as 50 grams per square meter.

Figure 2:
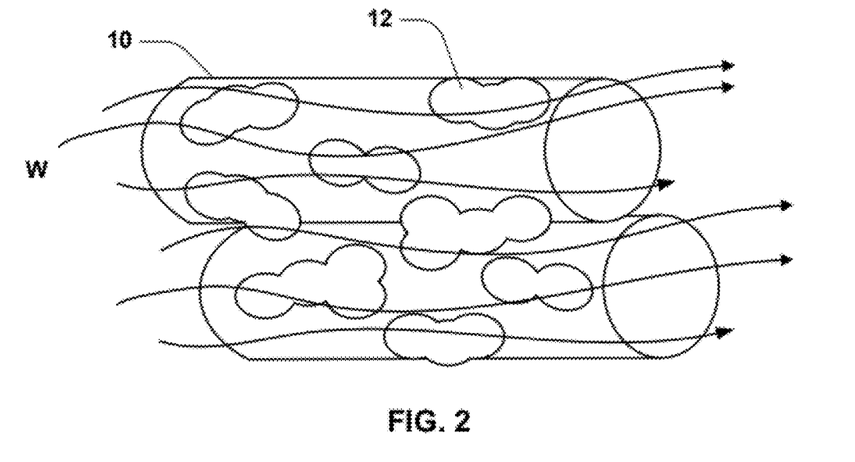
FIG. 2 illustrates an embodiment of nanofibers including bacteria colonies thereon.
Figure 3:
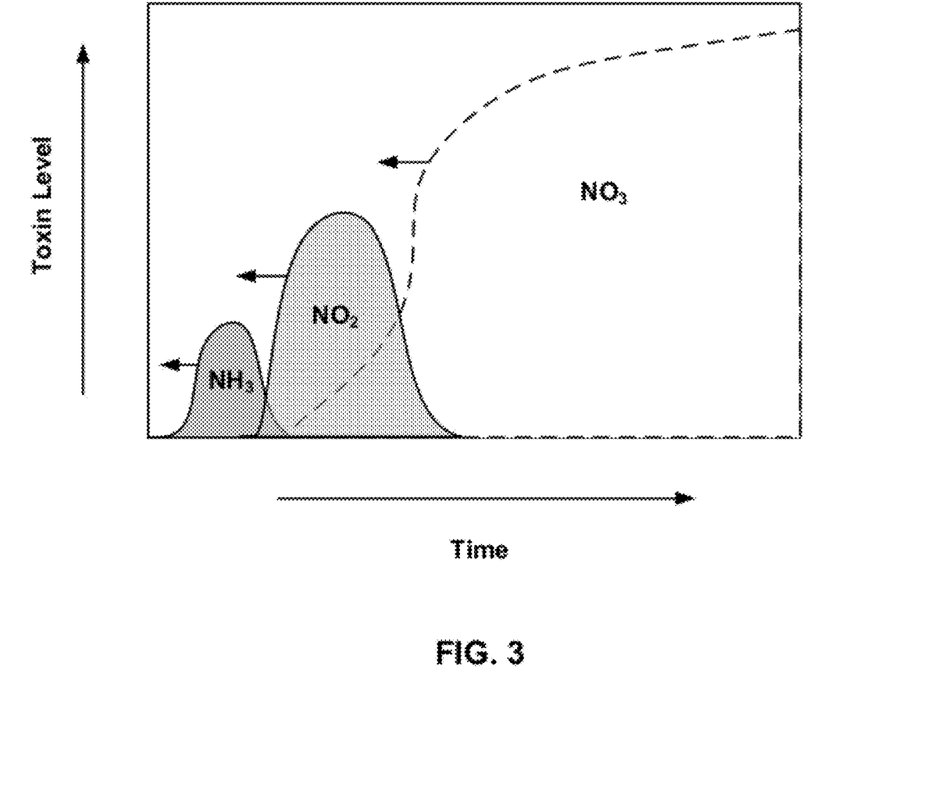
FIG. 3 illustrates a shift in ammonia, nitrite and nitrate bloom curves exhibited during tank start up when utilizing the nanofibers herein.
Figure 4:
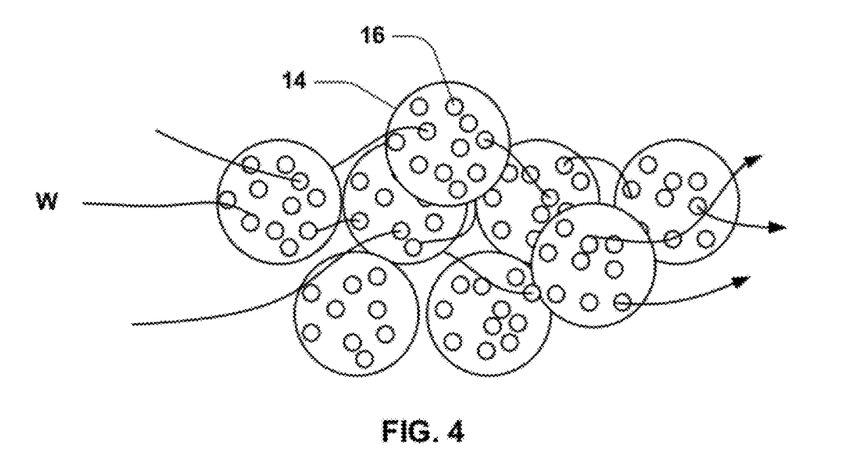
FIG. 4 illustrates particles including interstices.

The nanofibers 10 herein, an embodiment of which are illustrated in FIG. 2, are such that they may relatively more rapidly provide for beneficial bacteria growth 12 on the surface thereof while maintaining relatively high levels of particulate filtration. For example, FIG. 3 illustrates a graph of relative start up time versus toxin level. As may be appreciated the use of the nanofibers herein may now allow for relatively more rapid colonization and development of biological filtration requirements at tank start-up, shifting the ammonia, nitrite and nitrate, bloom curves to the left. At least one reason for this contemplated effect is that the nanofibers, while providing relatively high surface area for the nitrifying bacteria, may still provide high flow-thru and initial exchange with ammonia. That is, the relatively high aspect ratio of the fibers may provide for more efficient exchange of and removal of ammonia as relatively higher proportions are bacteria are exposed to water W flowing within the filter assembly. The structure and geometry of the nanofibers may therefore offer unexpectedly more efficient biological filtration than the porous particulate materials used in the art. For example, unlike particulate material 14, illustrated in FIG. 4, that may include a number of interstitial regions 16 (or craters); the nanofibers herein may allow for at least 50% or more by weight of the bacterial growth to occur on the external surface of the fiber, including all values and ranges from 50% to 99% by weight. Thus the bacterial growth need not rely on generally round particles, although in some embodiments, such particles may be present.

Figure 5:
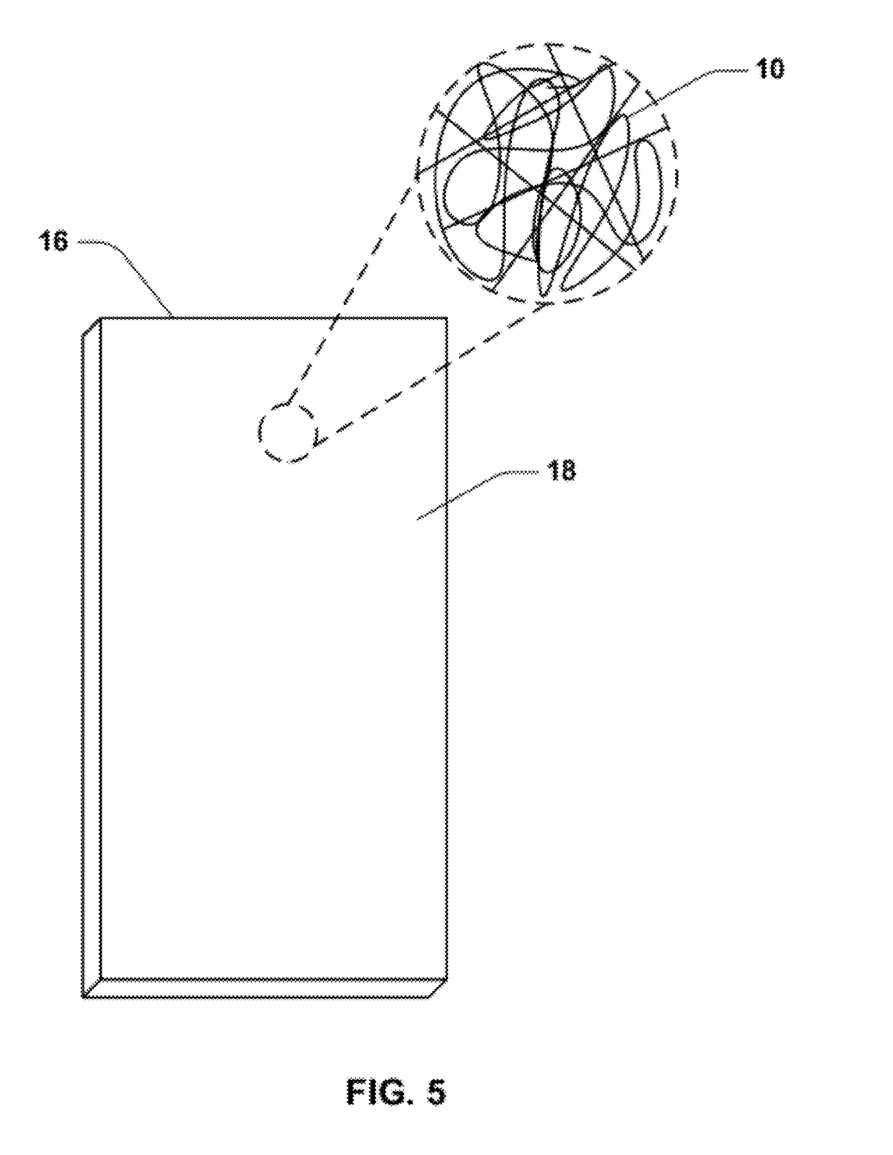
FIG. 5 illustrates an embodiment of filter media including nanofibers 10 in the form of a sheet.

The filter media may be pre-formed into various geometries such as balls or cylindrical batts while maintaining relatively high flow-through rates. In another embodiment, FIG. 5 illustrates that the filter media 16 may also be formed into sheets 18 (or pads) of given dimensions and/or various geometries. In some embodiments, the sheets may be pleated, further increasing surface area of the filter media. Therefore, it may be appreciated that the filter media may be provided as bulk media or as cartridge inserts. In the case of pleated structure, multiple sheets of pleated structure may be used depending upon the needs of a given filter system. When provided as bulk media, a given amount of media may be removed from the bulk and placed into a filter assembly. When provided as a cartridge, the cartridge may be placed into the filter assembly.

In some embodiments, the nanofibers may be formed into a nonwoven fabric. The nanofibers may be produced by electrospinning, melt blowing, or other methods that may produce fibers having an average diameter of up to 1,000 nm and greater than 0.1 nm. The fibers may be formed into a web directly or through processes such as carding, garneting, air lying, etc. In some embodiments, the fibers may be bonded, either through thermal adherence, mechanical entanglement, chemical adhesive or solvents or combinations thereof, such as thermal point bonding, calendaring with or without embossed rollers, hydroentangling, hot air knife, ultrasonic bonding. Bonding may stabilize the nonwoven fabrics. An example of filter media nanofibers may include EMINUS available from MILLIKEN of Spartanburg, S.C., which may be provided as a nonwoven fabric or batt.

Figure 6:
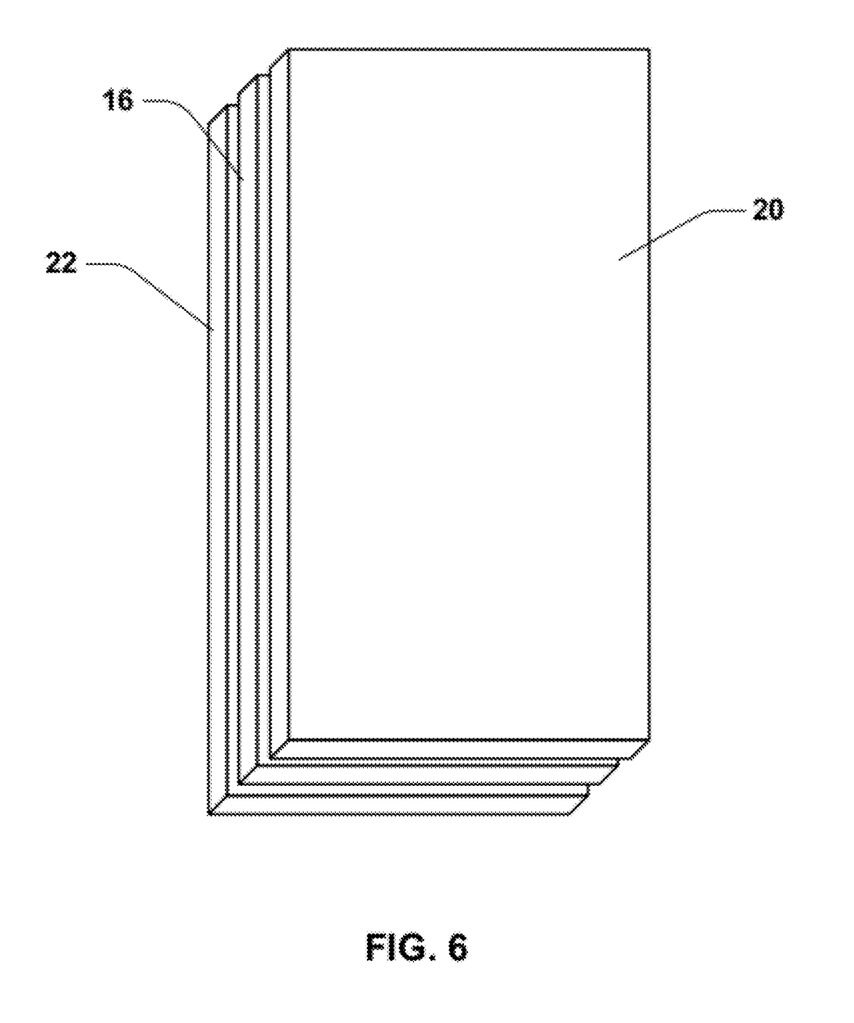
FIG. 6 illustrates an embodiment including a layer of filter media and other filter media or supporting layers used therewith.
Figure 7:
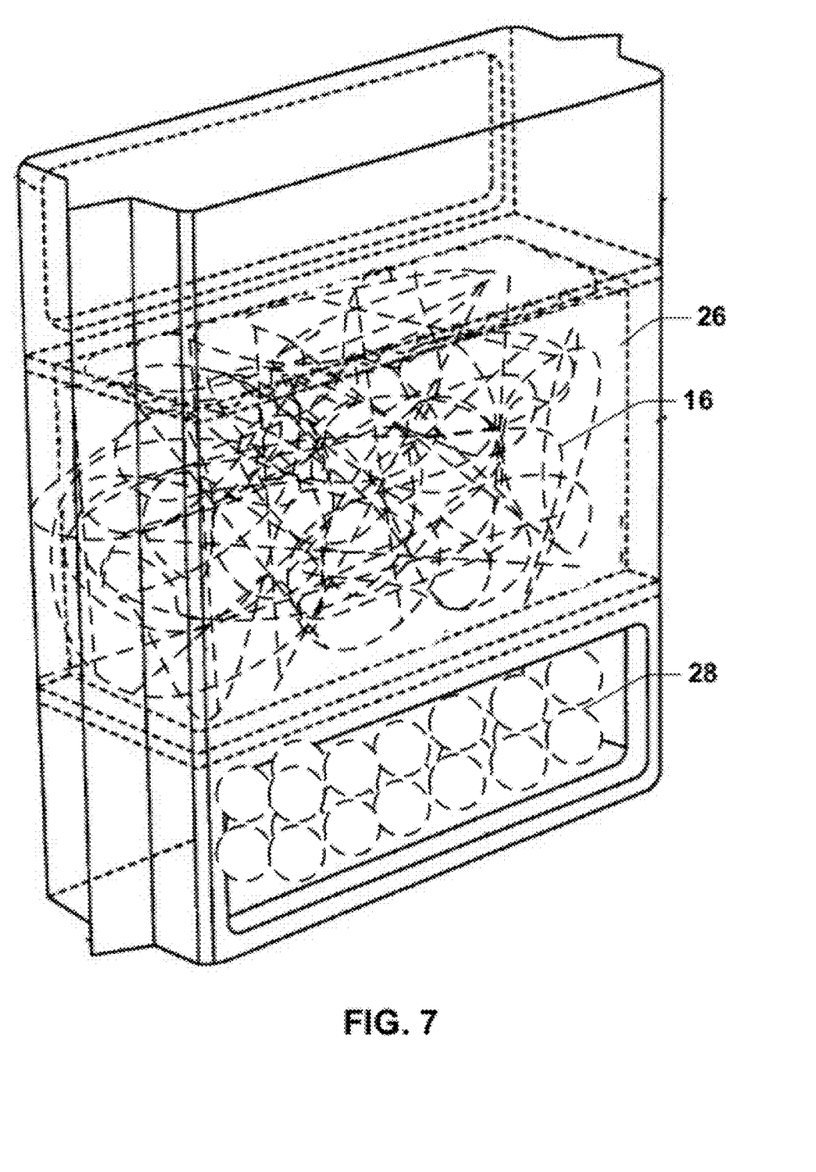
FIG. 7 illustrates an embodiment of a filter cartridge including a batt of nanofibers positioned therein in addition to other filter media.

The nanofiber filter media 16 may be used alone or in combination with one or more layers of other filter media 20 or support material 22 as illustrated in FIG. 6. For example, a support layer 20 of other nonwoven or woven fabrics, or foams, may be provided for use in combination with the nanofiber filter media. In addition, as illustrated in FIG. 7, the filter media 16 may be positioned within a filter cartridge frame 26 and used in combination with other media 28 useful in the filtration or treatment of aquarium water, including but not limited to, ceramic material (inorganic non-metallic solid) such as ceramic rings, biospheres, dolomite, crushed coral, crushed clam shells and like biological media which may enhance ammonia and nitrite reduction. Other filter media that may be used in conjunction with the nanofiber media herein includes activated charcoal, zeolite and like absorbents for the absorption of odors and impurities; and foam, glass fiber and like porous constructions for removing dirt and debris. Furthermore, the filter media may be treated with various additives that may separately improve bacteria growth.

Accordingly, also set forth herein is a method of providing a filter media exhibiting increased surface area for bacterial growth. The method may include providing filter media including nanofibers that exhibit an average diameter in the range of 0.1 nm to 1,000 nm. Furthermore, the nanofibers of the filter media may exhibit a relatively high surface area of greater than 2 square meters per gram. The relatively high surface area may result in an increase in the growth of bacteria that aids in converting ammonia to nitrites, nitrites to nitrates and combinations thereof.

In addition, during treatment of the aquarium water with the filter media, aquarium water may either be passed over the filter media and/or passed through the filter media, such that a given volume of water may contact the filter media and the bacteria colonizing thereon. Therefore, also set forth herein is a method of filtering water with filter media including the nanofibers, wherein the relatively high surface area of the filter media, i.e., greater than 2 square meters per gram, may provide increased bacteria colonization, exposure to high volumes of water and higher filtration efficiency. Again, the increased amount of bacteria may then unexpectedly provide increased efficiency in converting ammonia to nitrites and then nitrites to nitrates.

The aquariums suitable for filtration herein may be of any general size or configuration. More typically, however, the aquariums for which the benefits of utilizing the nanofibers herein is preferably realized on aquariums of 10-1000 gallons. The filter media herein may therefore become part of the filter system utilized in such aquaria which filtration devices may typically rely upon a filtering chamber that contains removable filter elements, and which may be in the form of canister filters, submersible filter assemblies and/or external filter assemblies, etc.

It is also contemplated herein that the nanofiber filtration system herein may be provided in a form that is preloaded with the bacteria necessary for biological filtration. That is the nanofiber filtration may include nitrosomonas and nitrobacteria so that when exposed to a source of ammonia, the nitrogen cycle immediately begins with the colonization of the indicated bacteria already present on the nanofiber surface. In the case of the nitrosomonas, this may include, but not be limited to *n. aestuarii, n. communis. n. europaea, n. halphila, n. marina, n. nitrosa, n. oligotropha,* and *n. ureae*. In the case of nitrobacteria, this may include *n. alkalicus, n. hamburgensis, n. vulgaris, n. winogradskyi*. The level of preloaded bacteria may therefore be preferably on the level of 0.1-10.0 percent by weight, where the bacteria may specifically be in a relatively dormant or precursor state thereby becoming active upon exposure to water flow. In such regard, the start-up cycling of a given tank to achieve the desired control and regulation of the nitrogen cycle is relatively more rapidly achieved and a given aquarium may be stocked with fish at a relatively more rapid level (i.e., over a relatively shorter time period).

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A filtration device for an aquarium comprising:
   a filtering chamber including a nanofiber filter media therein wherein said nanofiber filter media comprises random nanofibers having a diameter from 100 nm to 900 nm and an aspect ratio of length to diameter of at least 5:1 wherein said nanofibers contain nitrosomonas bacterium and/or nitrobacteria; and
   wherein the nanofiber filter media does not include a support material.

2. The filtration device of claim 1 wherein 80% by weight of said nanofibers in said filtering chamber have a diameter of 200 nm to 800 nm.

3. The filtration device of claim 1 wherein said nanofibers have a surface area of 2.0 $m^2$/gram to 10.0 $m^2$/gram.

4. The filtration device of claim 1 wherein said nanofibers are in the form of a nonwoven fabric.

5. The filtration device of claim 1 wherein said nanofibers have a surface and said colonization of said nitrosomona bacteria and/or said nitrobacteria occurs on said surface of said nanofibers.

6. The filtration device of claim 5 wherein 50.0% or more by weight of said nitrosomona and/or said nitrobacteria occurs on said surface of said nanofibers.

7. The filtration device of claim 1 wherein said nanofibers are bonded together.

8. The filtration device of claim 1 further including at least one of the following: ceramic material, crushed coral or crushed clam shells.

9. The filtration device of claim 1 further including at least one of the following: activated charcoal, zeolite, foam or glass fiber.

10. Filter media of claim 1 wherein 80% by weight of said fibers have a diameter of 200 nm to 800 nm.

11. Filter media of claim 1 wherein said nanofibers have a surface area of 2.0 $m^2$/gram to 10.0 $m^2$/gram.

12. Filter media of claim 1 wherein said nanofibers are in the form of a nonwoven fabric.

13. Filter media of claim 1 wherein said nanofibers have a surface and said nitrosomona bacteria and/or said nitrobacteria are present on said surface of said nanofibers.

14. Filter media of claim 13 wherein 50.0% or more by weight of said nitrosomona and/or said nitrobacteria occurs on said surface of said nanofibers.

15. Filter media of claim 1 wherein said nanofibers are bonded together.

16. Filter media of claim 1 further including at least one of the following: ceramic material, crushed coral or crushed clam shells.

17. Filter media of claim 1 further including at least one of the following: activated charcoal, zeolite, foam or glass fiber.

18. Filter media comprising:
   a nanofiber filter media comprising random nanofibers having a diameter from 100 nm to 900 nm and an aspect ratio of length to diameter of at least 5:1 wherein said nanofibers contain nitrosomonas bacterium and/or nitrobacteria; and
   wherein the nanofiber filter media does not include a support material.

19. A method for filtering water in an aquarium comprising: supplying a nanofiber filter media wherein said nanofiber filter media comprises random nanofibers having a diameter from 100 nm to 900 nm and an aspect ratio of length to diameter of at least 5:1 wherein said nanofibers contain nitrosomonas bacterium and/or nitrobacteria and contacting said water with said nanofiber filter media, wherein the nanofiber filter media does not include a support material.

* * * * *